INVENTORS
HAROLD C. GOODMAN
JOSEPH C. LOGUE
BY Harry T. Berriman
AGENT

Oct. 31, 1961 J. C. LOGUE ET AL 3,007,056

TRANSISTOR GATING CIRCUIT

Filed Dec. 5, 1956 2 Sheets-Sheet 2

United States Patent Office 3,007,056

Patented Oct. 31, 1961

3,007,056

TRANSISTOR GATING CIRCUIT

Joseph C. Logue, Poughkeepsie, N.Y., and Harold C. Goodman, Rosemont, Pa., assignors to International Business Machines Corporation, New York, N.Y., a corporation of New York Filed Dec. 5, 1956, Ser. No. 626,380
1 Claim. (Cl. 307—88.5)

This invention relates to information storage systems of the type wherein low level storage devices such as magnetic cores or the like are the principal storage medium, the reading out or sensing of stored information requiring an amplification of the small signals obtained therefrom in order to obtain signal indications of a usable level. The invention is shown as particularly applied to a magnetic core memory system wherein the amplifying and controlling circuitry utilizes transistors as the principal circuit elements.

In a magnetic core memory system the individual storage cores may be arranged in one or a plurality of so-called storage planes. A core plane may be considered as having a series of spaced rows (X) extending in one direction and another series of spaced columns (Y) extending in a direction transversely to the first lines so as to intersect them, a storage core being arranged at each such intersection of an X row and Y column. Each core includes an X row and a Y column winding thereon each of which is connected in series with the similar X and Y windings of the cores of the same X row and Y column.

Each of the storage cores is constructed of a material having a so-called rectangular B—H hysteresis loop. As a result, each core is capable of occupying either one of two possible magnetic states or directions of magnetic saturation. One of these states may be designated as representative of a binary zero, for example, while the alternate state would be representative of a binary one. Assuming a binary zero storage representation as the normal state of a core, any desired core in a plane may be transferred from its binary zero to one state by applying a current impulse through the series connected X windings of the X row the desired core occupies and simultaneously applying a current impulse through the series connected Y windings of the Y column the desired core occupies. The currents applied to the selected row and Y line are of such a direction and magnitude, that their combined action in the X and Y windings of the desired core at the intersection of the chosen X row and Y column, generates a field of sufficient magnitude to transfer the core from its binary zero representative magnetic state to the binary one state, other cores in the selected X row and Y line being unaffected.

To readout the stored information in a chosen core, current impulses are again applied to the proper X row and Y column at the intersection of which is the desired core. These latter current impulses are, however, applied in a direction reverse to that by which a binary one is stored in a core. As a result of these reverse or readout impulses, the selected core if storing a binary one, will be subject to a magnetic field of sufficient magnitude to flip it from the binary one to the binary zero state, other cores in the related X row and Y column being unaffected. Since the above described X and Y winding of a core may, if properly impulsed, reverse the state of the core, they are referred to as drive windings.

There is provided for each of the cores, another winding defined as a sense winding. All of the sense windings of an entire core plane may be connected in series and connected to a transistor amplifier. If a binary one is stored in a core, the reading out of the core (flipping it from binary one to zero), induces an impulse in the related sense winding. This impulse is amplified in the amplifier to give a usable output signal indication of the fact that a binary one had been stored in the readout core. There is an impulse induced in the sense winding of a selected core when storing a binary one therein, but this impulse is in a reverse direction to an actual output pulse and may be discriminated against by proper circuitry, or by rendering the sense amplifier inoperative at the time any recording or storing in the cores is being effected.

By reason of the capacitive coupling between sense windings and drive windings of adjacent cores of the same core plane, or cores of adjacent core planes in a multi-plane storage array, the potential of an entire sense winding may change with respect to ground. This change may be amplified sufficiently in the normal single transistor output amplifier arrangement so as to give erroneous output signals.

Another source of spurious signal results from the fact that the B—H hysteresis loops of the core material is not perfectly rectangular. As a consequence, demagnetization effects may occur to the magnetic elements which are not selected but which are inductively coupled to the excited row and column windings. Furthermore, these cores make some spurious contribution to the reading signal which is other than that obtainable from the selected core itself. The desired signal to undesired signal ratio in the reading circuit is improved by winding the sense winding on all the magnetic ones of the related plane so that each core portion of the entire plane sense winding is in the opposite sense to the winding on the adjacent cores. It is thus evident that the read signals generated from a core plane will be bi-polar.

In the subject invention, each end of the series connected core sense windings feeds the input of a separate PNP amplifying transistor. The outputs of the two amplifiers feeding opposite ends of the primary of an H ferrite type core transformer in a push-pull arrangement. By this arrangement only the difference signal developed between the terminals of a sense winding are amplified, changes in a like sense of the winding terminals being cancelled out in the transformer.

By reason of the bi-directional winding arrangement of the sense windings, and as previously mentioned, the difference signals generated in a sense winding are bi-polar (both positive or negative). These bi-polar signals are amplified by the push-pull amplifier arrangement, and are rectified by a separate diode in each leg of the secondary of the H ferrite output transformer into unipolar positive going output signals. These latter signals are applied to another transistor amplifier which is permitted to operate only at a time when a signal pulse applied thereto is the result of a core readout operation, the signals resulting from core readin operations being accordingly discriminated against. The operation of the last mentioned amplifier only at readout time is controlled by a unique gate circuit control, the latter controlling the final transistor amplifier stage of a plurality of core planes.

It is accordingly a principal object of the invention to provide an improved and reliable information storage system.

It is an other object of the invention to provide an improved and reliable electrical information storage system, wherein low level storage devices are utilized.

It is another object of the invention to provide an improved transistor amplifier arrangement as the output means for a core plane sense winding, the improved arrangement eliminating the amplification of erroneous signals induced in the sense winding by capacitive coupling action.

It is another object of the invention to provide a push-pull coupling arrangement of a pair of PNP transistors of the grounded base configuration as the output means for a core plane sense winding.

It is still a further object to provide a pair of PNP transistor amplifiers as the output means for a sense winding of a core plane, each terminal of the sense winding feeding the input of a related one on the two amplifiers, the output of the two amplifiers feeding the primary of a transformer in a push-pull arrangement, signal changes in a like sense applied from said core winding to both amplifiers being accordingly cancelled out in the output transformer, so that only amplification of the difference signals developed between the terminals of the sense winding is effected.

It is a further object of the invention to provide apparatus including push-pull connected transistor amplifiers for amplifying only bi-polar signals generated in a core sense winding as a result of record and read operations in said winding, erroneous signal changes of a like sense induced in said winding between ends thereof as a result of capacitive coupling etc., being cancelled out, the amplified bi-polar signals being rectified to unipolar signals which are applied to another transistor amplifier, the latter being gated so as to amplify only the unipolar signals resulting from read operations in the core.

It is a further object to provide apparatus whereby a plurality of transistor amplifiers to each of which signals are fed from a separate source, are all controlled by a single control transistor so as to be responsive only at a specific time to signals thereto from their related separate sources.

It is a further object of the invention to provide in a bank of transistor amplifiers, one for each core plane of a core storage system and to which both read and record signals are applied in response to corresponding read and record operations in the associated core plane, a common transistor gate control means for gating all said core plane related amplifiers so as to be responsive only to signals resulting from read operations in the related core plane.

It is a further object to provide a multi-plane core memory system a single transistor gate control for generating a single gate pulse only at a read time, the gate pulse being simultaneously applied to a plurality of transistor amplifiers to render them capable of operation during the duration of the gate pulse, each amplifier being coupled to a group of sense windings in a related one of said core planes, each amplifier being accordingly responsive only to a signal generated in a sense winding of the related core plane during the duration of the gate control pulse.

It is still a further object to provide apparatus as in the immediately preceding object with the further provision that the gate signal pulse is generated at cyclic intervals during which readout operations are effected in the memory system so that only so-called read signals can be amplified by said amplifiers.

It is a further object to provide a low level signal gate control for gating a high current load of a large capacitive component, the high current load being in the form of a plurality of amplifiers each feeding its related load.

Other objects of the invention will be pointed out in the following description and claim and illustrated in the accompanying drawings, which disclose, by way of example, the principle of the invention and the best mode which has been contemplated of applying that principle.

Figure 1:
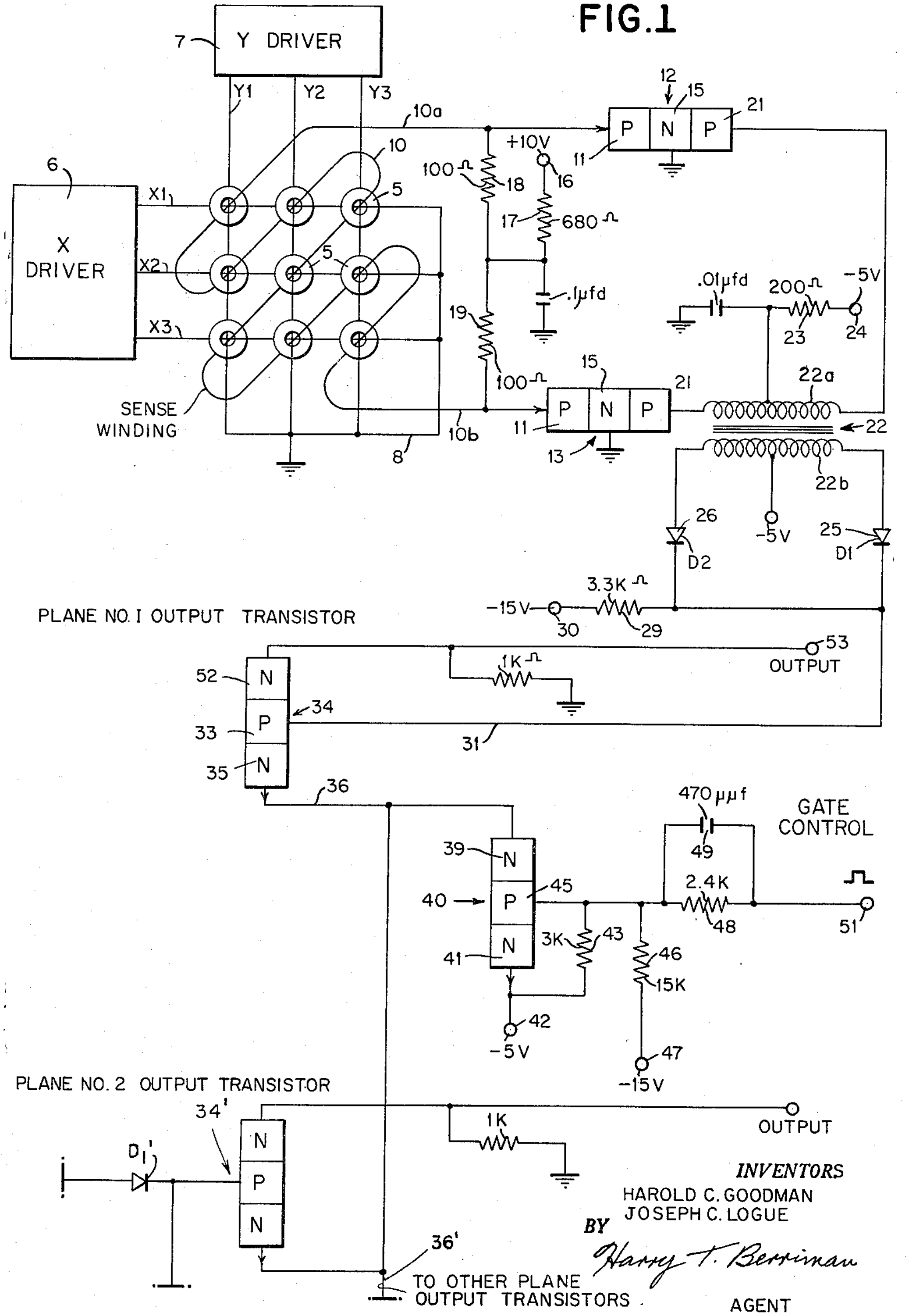
FIGURE 1 is a circuit diagram of the improved information storage system.

Referring now to FIG. 1 there is indicated a representative core plane having nine magnetic storage cores 5 which are arranged in a 3×3 array as indicated. The core plane may be considered as having three spaced rows $X_1$, $X_2$ and $X_3$ extending in a first direction, and three other spaced rows $Y_1$, $Y_2$ and $Y_3$ extending in a direction transversely to the X rows so as to intersect them, a storage core 5 being arranged at each such intersection of an X row and Y column. In actuality, each X row and Y column is an electrical conductor which extends from a related output terminal of a corresponding so-called X driver 6 or Y driver 7, and is then similarly threaded through each of the associated 3 cores, in turn, in the related X row or Y column. Each conductor threaded through a core actually forms a related so-called X or Y winding on the core by which a magnetic field is impressed on the core upon an energization of that conductor. Each X or Y conductor after passing through the last core of that line is connected to a common conductor 8, the latter conductor being connected in turn to ground.

Each magnetic core has two distinct magnetic states, a first state being representative of a binary zero, for example, while the alternate state is representative of a binary one. Assuming a binary zero storage representation as the normal state of a core, any desired core in the core plane may be transferred from its binary zero to one state. This is effected by simultaneously operating the X and Y drivers in a well known manner to apply a so-called $+\frac{1}{2}H_e$ select current to the particular X and Y lines that the desired core occupies. The combined field generated by the X row $+\frac{1}{2}H_e$ select current and the Y column $+\frac{1}{2}H_e$ select current in the desired core at the intersection of the two energized conductors, gives a resultant $1H_e$ current at the selected core, which generates a magnetic field sufficient to transfer this core from its binary zero to its binary one magnetic state. It will be appreciated that all the other cores in the selected X line and Y line are each subjected to a field in correspondence to the related line $+\frac{1}{2}H_e$ select current and this field is of only ½ the magnitude required to transfer the core state. These cores accordingly remain unaffected.

In addition to the X and Y windings formed on each core by the associated X and Y lines, there is also provided a sense winding for each core. The sense windings of the cores are achieved by similarly threading a conductor 10 through each of the cores of the core plane in turn, the sense windings of all the cores in the core plane accordingly being connected in series. Each end of the sense winding conductor 10 is connected through associated conductors **10*a* and 10*b* to the emitter 11 of a related transistor 12 or 13**, as indicated.

A base electrode 15 of each of the transistors 12 and 13 is connected to ground while a bias potential is applied to each of the related emitters 11 by a circuit extending from a +10 volt supply 16 through a resistor 17 to the midpoint of a voltage divider network comprised of resistors 18 and 19, the other end of each of the resistors 18 and 19 being connected to the emitter 11 of a related one of the transistors 12 and 13, as indicated. A collector electrode 21 of each of the transistors 12 and 13 feeds a related end of the primary winding of an output transformer 22 in a push-pull arrangement. The primary of the transformer 22 is center-tapped and linked through a resistor 23 to a −5 volt supply 24. The core of the output transformer 22 is fabricated from so-called "H" ferrite core material which is a core material having a B—H curve that is fairly linear.

To read out the stored information in any chosen core in the core plane, $\frac{1}{2}H_e$ select currents are applied to the proper X row and Y column conductors at the intersection of which is the desired core. These $\frac{1}{2}H_e$ select currents are, however, applied in a reverse sense to that by which the $\frac{1}{2}H_s$ select currents are applied in storing a binary one in any selected core. The combined action of these readout select currents on the X and Y windings of the desired core at the intersection of the chosen X and Y conductors, generates a magnetic field of sufficient magnitude so that if this core is in its binary one magnetic representative state, it will be transferred to its binary zero magnetic representative state. If the selected core is already storing a binary zero prior to the application of the readout field, it will still be in the binary zero position after the application of the readout field.

If a selected core is transferred from a binary one to a binary zero state upon the application of the readout field thereto, the transferring action generates a momentary potential difference between the ends of the related sense winding. The voltage potential generated on each end of a core sense winding as a result of a readout-transference of the magnetic state of the related core, is applied through the associated sense windings and a conductor 10*a* to the emitter 11 of transistor 12, and through a conductor 10*b* to the emitter 11 of transistor 13. It is thus evident that if a potential difference is generated between the ends of a selected core sense winding, this potential difference is applied between the emitter electrodes 11 of the transistors 12 and 13.

Figures 2A, 2B, 2C, 2D, 2E:
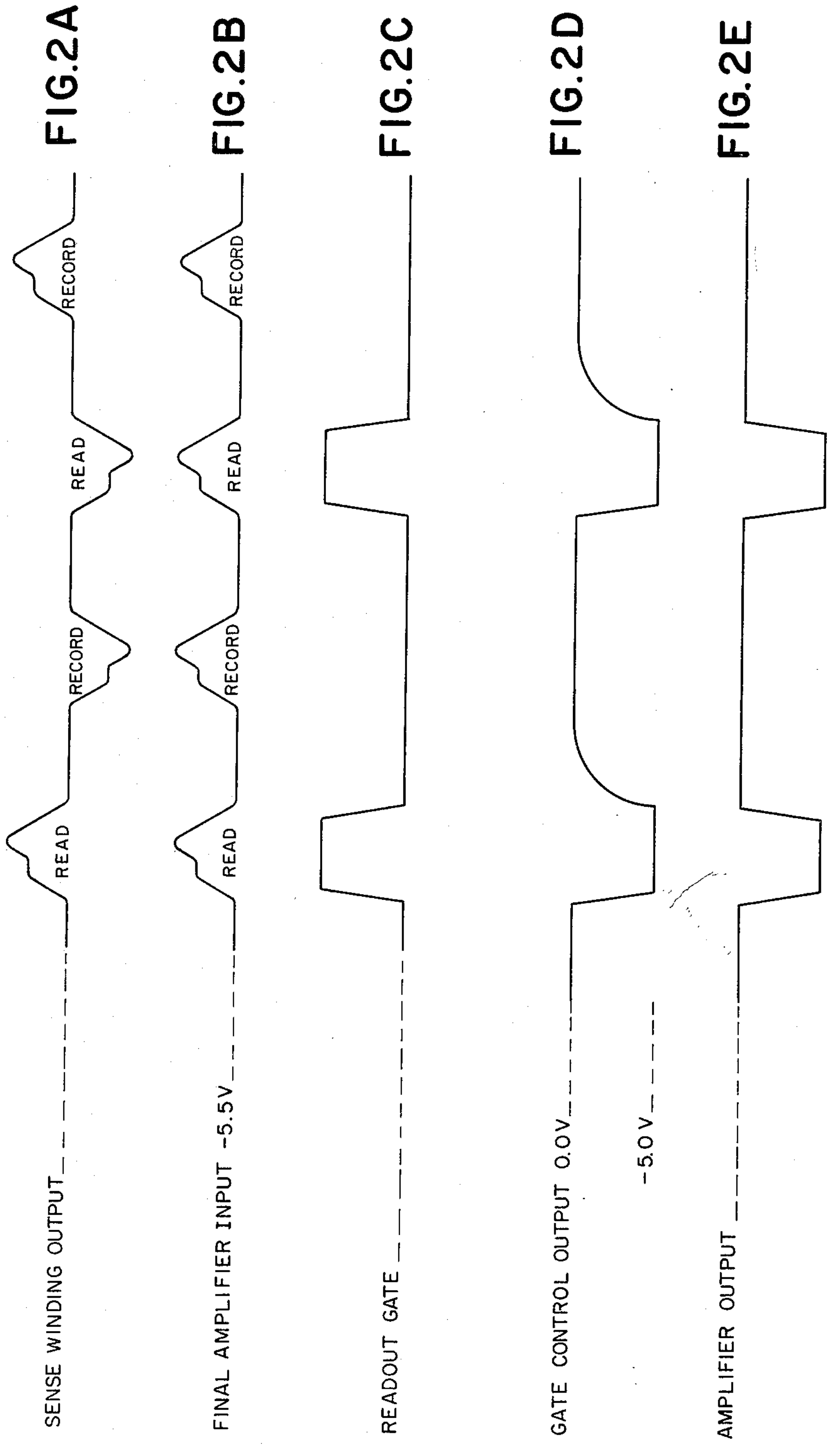
FIGS. 2A through 2E are representations of the pulse forms appearing at particular points of the memory system and also indicate the relative time relationship of the pulse forms.

Referring now to FIG. 1 it will be particularly noted that the conductor 10 is threaded through the various cores of the associated core plane to form the sense windings thereon in such a manner, so that any possible sense signals generated in a particular core sense winding, is always in a reverse sense to any possible sense signals generated in the immediately adjacent core sense windings. It is thus evident a sense signal coming from the core plane can be positive or negative (bi-polar) dependent on which particular core of the array generates the signal. This is indicated in FIG. 2A wherein proceeding from the left towards the right in a time sense, the first sense or read signal is positive, while the second sense or read signal is negative. As previously mentioned such an arrangement enhances the desired signal to undesired signal ratio in the sensing circuit.

Arbitrarily assuming, a positive sense signal generated as a result of a "reading out" of the stored binary one in a particular core, the resultant positive shifting of the emitter 11 of transistor 12 effects a corresponding positive shift of the related collector electrode 21, the shift being applied to the upper end of the primary coil of transformer 22. Similarly, the simultaneous negative shift of the emitter of transistor 13 effects a corresponding negative shift of the related collector electrode, this shift being applied to the other end of the primary of the transformer 22. It is thus evident that the potential difference generated between the ends of a sense winding is further amplified by the amplifiers 12 and 13 and applied to the output transformer primary winding.

If a selected core is transferred from a binary zero to a binary one during a recording operation, this shift of magnetic sense also induces a signal in the related sense winding. This latter signal, which may be defined as a record signal is, however, of a reverse sense to the read signal induced in a sense winding by the reading out of a binary one (transference of core state from binary one to binary zero representative magnetic state) for that particular core. Thus as also indicated in FIG. 2A, if a positive sense signal is generated in the reading out of a particular core, a negative record signal will be generated upon recording a binary one in that core. Similarly if a negative read or sense signal is generated on the reading out of a particular core, a positive record signal is generated upon recording a binary one.

The bi-polar read and record signals coming from a core plane are amplified in the associated push-pull connected transistor amplifiers 12 and 13 and applied to the terminals of the output transformer 22 primary winding 22*a* corresponding bi-polar signals being, in turn, induced in the secondary winding 22*b* of the output transformer.

It will be noted in FIG. 1 that there is connected in each leg of the secondary winding 22*b* a related diode 25 or 26, a center tap of the secondary being connected to a −5 volt supply 24. The diodes 25 and 26 are electrically commoned, as indicated, and linked through a suitable load resistor 29 to a −15 volt supply 30 to thus form a full wave rectifier circuit, the output of the rectifier circuit being connected through a conductor 31 to the base of an NPN output inverter transistor 34. By reason of the full wave rectifying action of the diodes 25 and 26, the bi-polar read-record signals induced in the secondary of the output transformer, are converted to unipolar positive going signals as indicated in FIG. 2B, these signals being applied through conductor 31 to the base 33 of a gated NPN transistor amplifier 34. The amplifier 34 is "gated" so that only the positive going signals on conductor 31 which are the result of readout operations in the core plane are capable of effecting an operation of the amplifier 34, the positive going signals on conductor 31 resulting from reading operations in the core plane being ineffective. This gated operation is achieved as described hereinafter.

An emitter electrode 35 of amplifier 34 is linked through a conductor 36 to the collector electrode 39 of an NPN transistor line driver 40. An emitter electrode 41 of the latter transistor 40 is linked to a −5 volt supply terminal 42, the terminal 42 also being linked through a resistor 43 to a base electrode 45 of the transistor, as indicated. The base electrode 45 is also linked through a resistor 46 to a −15 volt supply terminal 47 and also through an input circuit comprised of a resistor 48 and a capacitor 49 to a terminal 51 to which positive readout gate pulses, as represented in FIG. 2C, are applied from a suitable source (not shown). The readout gate pulses are generated in a well known manner and are timed so that each successive gate impulse spans the time interval when a read signal may be generated in a sense winding, this timing interrelationship being indicated by the waveform representations of FIGS. 2A and 2C. All of the waveform representations shown in FIGS. 2A through 2E are constructed on an identical time scale.

When there is no readout gate pulse on input terminal 51, the base electrode 45 of the NPN transistor 40 is biased from the −15 volt bias supply terminal 47 to a point more negative than the −5 volts applied from terminal 42 to the associated emitter electrode 41. As a result, the transistor 40 is inoperative and the associated collector electrode 39 is at zero potential. This zero potential is applied through conductor 36 to the emitter 35 of the transistor 34 for each core plane. When there is no signal output from the diodes 25 or 26, conductor 31 and the associated base electrode 33 of transistor 34 for each core plane are at a steady state or quiescent value of approximately −5.5 volts with the circuit parameters indicated. It should be mentioned that in FIG. 1 for the particular circuit parameters indicated, the various transistors 12, 13, 34 and 40 have an alpha prime or beta of 35. With the emitter 35 held at 0 volts through conductor 36, as described above, and the associated base electrode at the quiescent value of −5.5 volts, an associated collector electrode 52 and, in turn, a connected output terminal 53 for that core plane, is at a zero potential.

At record time, a positive going record signal (see FIG. 2B) is applied through conductor 31 and drives the base electrode 33 from its −(minus) 5.5 volts potential towards 0 potential. The record signal is however, of insufficient magnitude to drive the base potential above the 0 potential applied to the associated emitter 35 through conductor 36, and the associated collector 52 and the connected output terminal 53 remains at zero potential. Thus signals applied to a transistor 34 by reason of record operations in the related core plane have no effect on the output terminal 53 for that plane. At read time, however, the following action takes place.

During the time interval when a read or sense operation may take place in the memory system, a positive readout gate signal of a waveform, as indicated in FIG. 2C, is applied to terminal 51 in the base input circuit to transistor 40. The readout gate raises the potential of the base 45 positively relative to the potential of the associated emitter 41 a sufficient amount so that the transistor 40 is driven into saturation and the associated collector potential drops to approximately −5 volts, as indicated in FIG. 2D. This drop in collector potential is applied through conductor 36 to the emitter 35 of the amplifier 34 in FIG. 1 and also through corresponding conductor 36′ to emitter electrode of the output transistor 34′ of the No. 2 core plane, etc. of the multiplane core array. Only a representative portion of the core plane circuitry such as the diode $D_1'$ is shown for transistor 34′, the diode $D_1'$ corresponding to the diode $D_1$ of the transistor 34. With the emitter 35 maintained at −5 volts during the interval when a readout operation may take place in a core plane, the application of a read or sense signal through conductor 31 to the base 33 of the related transistor amplifier 34, drives the amplifier 34 into saturation and the potential of the associated collector electrode 52 drops from 0 to −5 volts as indicated in FIG. 2E. It is thus evident that under control of a single NPN transistor 40 which, in turn, is controlled by the readout gate signals (FIG. 2C), the NPN output transistor 34 for each core plane is conditioned by the waveform, as indicated in FIG. 2D. Consequently, only signals resulting from read operations in a core plane can operate the associated amplifier 34 to give a representative read signal output as indicated in FIG. 2E.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

Apparatus for simultaneously transferring signals from each of a plurality of distinct unipolar signal sources to a related distinct receiving circuit for each such source comprising, in combination, a plurality of unipolar signal sources, a plurality of receiving circuits, one for each said sources, a plurality of first transistors, one for each said separate signal sources, each said transistor having junction emitter, base, and collector electrodes, a load impedance for each said transistor and connected from the collector electrode thereof to ground, a conductor connecting each of said collector electrodes to the related receiving circuit, signal input means for transmitting the unipolar signals from each said source to said base electrode of the associated transistor, constant potential biasing means for each of said transistors and linked to each said base electrodes thereof to normally bias said related transistor unresponsive to the related applied unipolar signals, common means for applying a two level control signal to the emitter electrode of each of said transistors, one level of said signal overcoming said biasing means and conditioning said transistors for response to any unipolar signal applied thereto from said related source during the duration of said one level, said common means comprising a second transistor having junction emitter base and collector electrodes, means electrically coupling the collector electrode of said second transistor to the emitter electrodes of said first transistor, constant potential means linked to said emitter electrode of said second transistor, biasing potential means linked to said base electrode of said second transistor and normally biasing said electrode to a potential relative to said related emitter electrode to render the transistor inoperative, and signal input means for transmitting to said second transistor emitter an input potential of polarity and magnitude sufficient to overcome the bias thereof and render said second transistor conductive, said latter transistor when conductive generating on the associated collector electrode, said one level of the two level control signal, wherein all of said first transistors receiving a unipolar signal from their related signal sources simultaneously transfer said unipolar signal to their related receiving circuit.

References Cited in the file of this patent

UNITED STATES PATENTS

| | | |
|---|---|---|
| 2,554,987 | Hogle | May 29, 1951 |
| 2,571,017 | Dempsey | Oct. 9, 1951 |
| 2,620,448 | Wallace | Dec. 2, 1952 |
| 2,670,445 | Felker | Feb. 23, 1954 |
| 2,722,649 | Immel | Nov. 1, 1955 |
| 2,785,305 | Crooks et al. | Mar. 12, 1957 |
| 2,831,126 | Linvill et al. | Apr. 15, 1958 |
| 2,874,313 | Githens | Feb. 17, 1959 |
| 2,960,681 | Bonn | Nov. 15, 1960 |

OTHER REFERENCES

Bright: Junction Transistors used as Switches, AIEE transactions, Part I, Communications & Electronics, March 1955, pp. 111 to 121.

Article in "Electronics," by Beter et al., June 1955, pp. 132–136.